(No Model.) 2 Sheets—Sheet 1.

T. A. EDISON.
DYNAMO OR MAGNETO ELECTRIC MACHINE.

No. 263,148. Patented Aug. 22, 1882.

WITNESSES:
D. D. Mott.
J. Ellis Clark.

INVENTOR:
T. A. Edison
BY Dyer & Wilber
ATTORNEYS.

(No Model.) 2 Sheets—Sheet 2.

T. A. EDISON.
DYNAMO OR MAGNETO ELECTRIC MACHINE.

No. 263,148. Patented Aug. 22, 1882.

WITNESSES:
S. D. Mott
J. Ellk Clark

INVENTOR:
T. A. Edison
BY Dyer & Weber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 263,148, dated August 22, 1882.

Application filed November 28, 1881. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines, (Case No. 360;) and I do hereby declare that the following is a full and exact description of the same, reference being had to the accompanying drawings, and to the letters of reference marked thereon.

The object of this invention is to produce an improved form of dynamo or magneto electric machine, or electric engine which shall possess the features of exceedingly low resistance and great strength, compactness, and economy. This I accomplish by the use of copper disks, which form the inductive portion of the revolving armature and from which a continuous current of electricity is taken. These copper disks are arranged in two sets placed on opposite sides of an iron plate, which is of circular shape and forms the core of the armature. The disks are securely clamped together and to this central plate or core, properly-insulating disks being placed between the separate disks and also next to the core. The exciting-magnet has its polar extensions placed on opposite sides of the peculiar armature, and these are extended on the sides of the armature toward the shaft of the same, the extended sides being beveled, so that the direct attractive force between such polar extensions will be small compared with that between the polar extensions and the core of the armature. The copper disks on one side of the central plate or core all have currents set up in the same direction, but in the opposite direction to those on the other side. Cross-connections are provided at the periphery of the disks, which connect the disks in series, so that an electro-motive force is generated, due to all the disks, and connections are made with the commutator-cylinder upon which bear the commutator-brushes.

Figure 1:
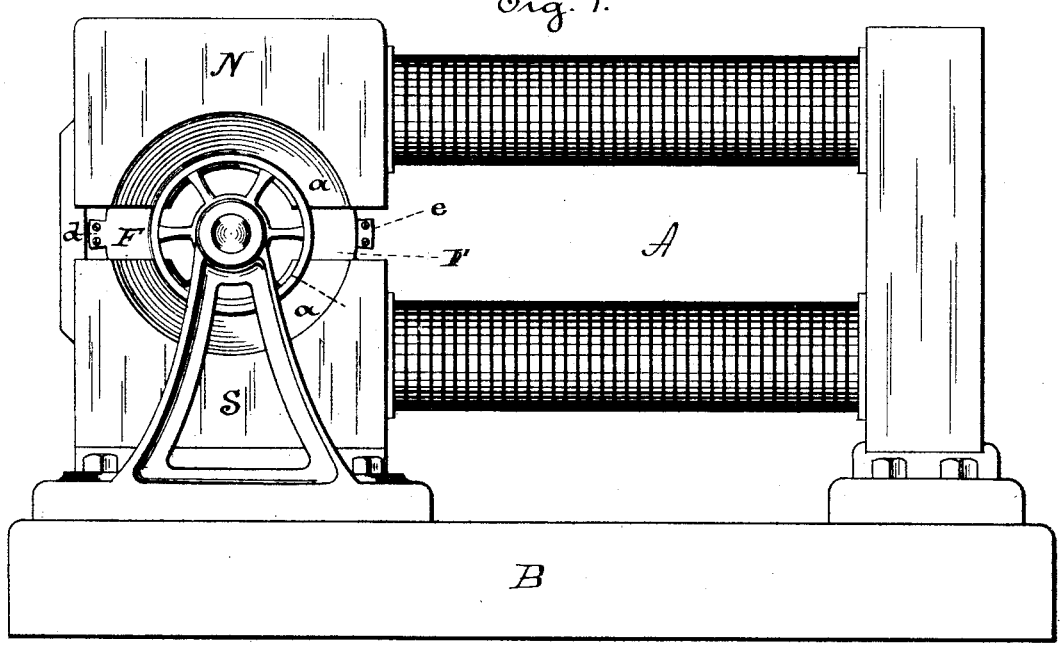
Figure 4:
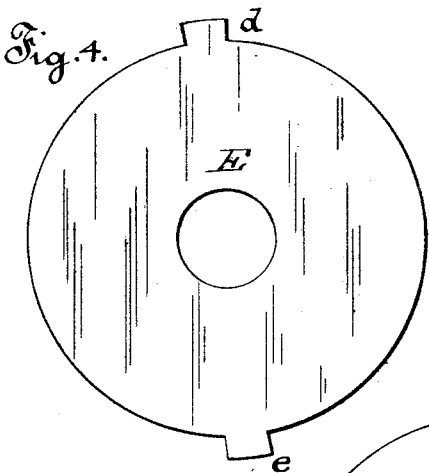
Figure 5:
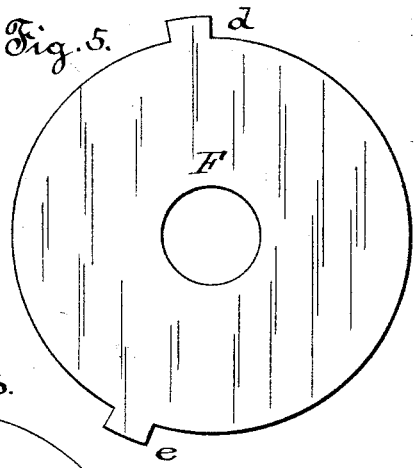
Figure 6:
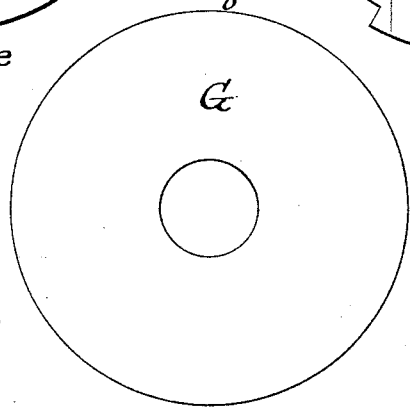
Figure 2:
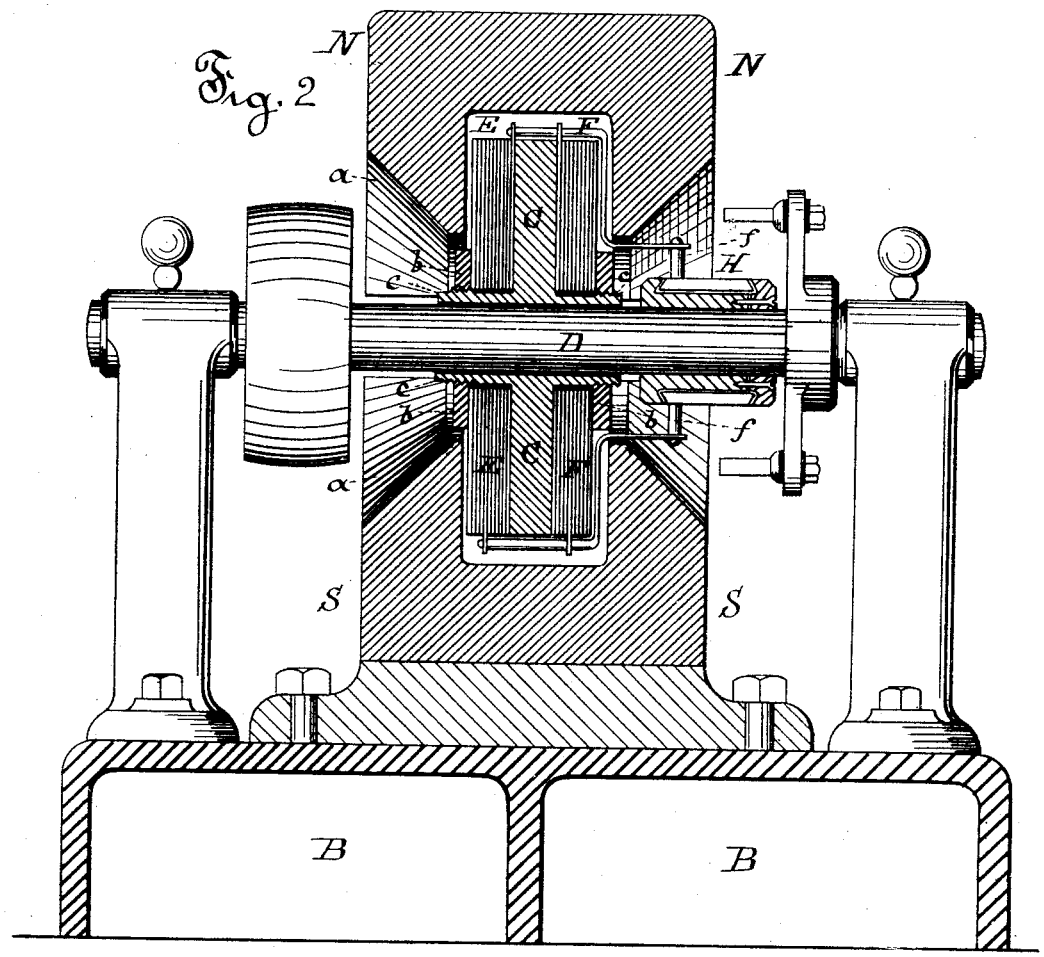
Figure 3:
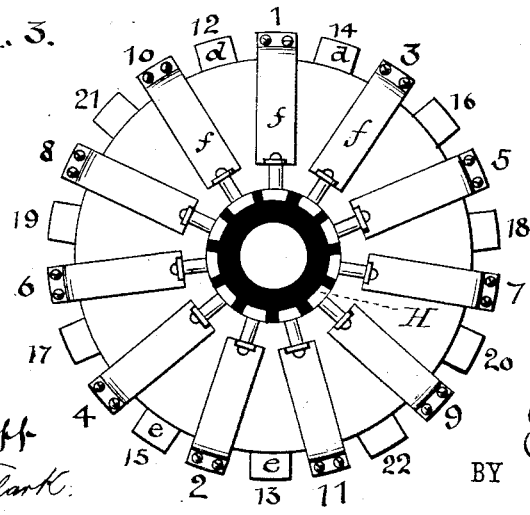

The foregoing will be better understood from the drawings, in which Figure 1 is a side elevation of the machine; Fig. 2, a vertical cross-section of the same on the line of the armature-shaft; Fig. 3, an elevation of the commutator end, the commutator-cylinder being in section; Figs. 4 and 5, elevations of copper inductive disks, and Fig. 6 an elevation of an insulating-disk.

Similar letters denote corresponding parts in all six figures.

N S are the polar extensions of the field-magnet A, which is mounted upon a suitable base, B. These polar extensions are hollowed out on their inner faces, forming chambers which inclose opposite portions of the armature and through which said armature revolves. The sides of the polar extensions N S are beveled, as shown at $a$, so as to reduce the attractive force acting directly across between the polar extensions. The armature is composed of an iron core, C, which is a circular plate keyed to the shaft D, and two sets, E F, of copper disks. These disks are placed on opposite sides of the central plate or core, C, and are insulated from each other and from the core by disks G of insulating material, preferably of paper. The disks are clamped together and to the core by brass screw-rings $b$, turning on the ends of the extended hub $c$ of the core; but the disks may be secured in addition by bolts passing directly through them. The disks have projections $d$ $e$ on their periphery. The projections of the two sets of disks are joined by cross-connections, so that the disks will be connected in a continuous and symmetrical series. H is the commutator-cylinder, to which the disks are connected by rods or plates $f$, the alternate connections of the disks with each other being shown as thus connected with the bars of the commutator-cylinder. The lines of force at each pole of the exciting-magnet move between the pole and the core of the armature on each side of said core. The disks of each set cut in opposite direction on their opposite portions the lines of force from the opposite poles of the magnet. Hence the currents generated in the disks of each set flow all in the same direction. The disks of one set cut in each field lines of force moving in the opposite direction from those cut by disks of the other set in the same field. Hence the currents generated in one set of disks flow in the opposite direction to those generated in the other set. This armature, it will be seen, will have an exceedingly low resistance, and will be compact and strong.

What I claim is—

1. The combination, with the field magnet or magnets of a dynamo or magneto electric machine, of a number of inductive disks connected so as to generate a continuous current, substantially as set forth.

2. The inductive disks revolving in two opposite fields of force and connected so as to generate a continuous current, substantially as set forth.

3. The combination, with the exciting magnet or magnets, of the revolving armature having a magnetic plate or disks and copper inductive disks, substantially as set forth.

4. The combination, with the exciting-magnet, of the armature having a central plate or disk of magnetic metal forming the core of the armature, and inductive disks arranged on opposite sides of such core and connected so that such disks shall generate a continuous current, substantially as set forth.

5. The combination, with the exciting-magnet, of the armature having central core and copper inductive disks on each side of the core, the cross-connections of such disks at their periphery, and the exterior commutator-connections, substantially as set forth.

6. The combination, with the revolving armature provided with a core of magnetic metal and inductive portions, of an exciting-magnet having polar extensions chambered to receive opposite portions of the armature, and reduced in width on their approaching faces, substantially as set forth.

This specification signed and witnessed this 25th day of October, 1881.

THOS. A. EDISON.

Witnesses:
   RICHD. N. DYER,
   H. W. SEELY.